United States Patent
Skowronek et al.

(10) Patent No.: US 9,824,366 B2
(45) Date of Patent: Nov. 21, 2017

(54) CUSTOMER PRE-SELECTED ELECTRONIC COUPONS

(75) Inventors: Dan Skowronek, Parker, CO (US); Dominic Morea, Massapequa, NY (US)

(73) Assignee: First Data Corporation, Greenwood Village, CO (US)

( * ) Notice: Subject to any disclaimer, the term of this patent is extended or adjusted under 35 U.S.C. 154(b) by 2129 days.

(21) Appl. No.: 12/169,024

(22) Filed: Jul. 8, 2008

(65) Prior Publication Data
US 2010/0010964 A1    Jan. 14, 2010

(51) Int. Cl.
*G06Q 30/00* (2012.01)
*G06Q 30/02* (2012.01)

(52) U.S. Cl.
CPC ................ *G06Q 30/02* (2013.01)

(58) Field of Classification Search
USPC ........................................................ 705/14
See application file for complete search history.

(56) References Cited

U.S. PATENT DOCUMENTS

| | | | |
|---|---|---|---|
| 5,098,131 A * | 3/1992 | Tucker | 283/105 |
| 5,806,045 A | 9/1998 | Biorge et al. | |
| 6,507,279 B2 | 1/2003 | Loof | |
| 2002/0046116 A1 | 4/2002 | Hohle et al. | |
| 2002/0091571 A1 | 7/2002 | Thomas et al. | |
| 2002/0095333 A1 * | 7/2002 | Jokinen | G06Q 30/02 705/14.26 |
| 2002/0179704 A1 | 12/2002 | Deaton | |
| 2003/0229541 A1 | 12/2003 | Randall et al. | |
| 2004/0193499 A1 * | 9/2004 | Ortiz et al. | 705/17 |
| 2004/0210477 A1 | 10/2004 | McIntyre | |
| 2004/0243519 A1 | 12/2004 | Perttila et al. | |
| 2004/0260608 A1 | 12/2004 | Lewis et al. | |
| 2005/0071227 A1 * | 3/2005 | Hammad | G06Q 30/0267 705/14.27 |

(Continued)

FOREIGN PATENT DOCUMENTS

| | | |
|---|---|---|
| EP | 964542 A2 | 12/1999 |
| GB | 2426149 A | 11/2006 |

(Continued)

OTHER PUBLICATIONS

Gao, Jerry, et al., "A Wireless-Based Virtual Salesman System," San Jose State University, Consumer Communications and Networking Conference, Jan. 5-8, 2004, pp. 581-588.

(Continued)

*Primary Examiner* — Alvin L Brown
(74) *Attorney, Agent, or Firm* — Kilpatrick Townsend & Stockton LLP

(57) ABSTRACT

Embodiments presented herein generally relate to novel systems and methods for managing electronic coupons. In embodiments, the user uploads one or more coupons into a mobile device. While shopping, the mobile device receives communications from one or more NFC sensors/transmitters associated with one or more products in one or more product displays. The mobile device can determine from information in the communication to which product the communication applies. The mobile device can then search for one or more uploaded coupons that apply to the one or more products. In embodiments, the mobile device alerts the user when one or more of the coupons apply.

25 Claims, 6 Drawing Sheets

(56) References Cited

U.S. PATENT DOCUMENTS

| | | |
|---|---|---|
| 2005/0149387 A1 | 7/2005 | O'Shea et al. |
| 2005/0149391 A1 | 7/2005 | O'Shea et al. |
| 2005/0234771 A1 | 10/2005 | Register et al. |
| 2005/0267809 A1 | 12/2005 | Zheng |
| 2006/0031126 A1 | 2/2006 | Ma et al. |
| 2006/0047573 A1 | 3/2006 | Mitchell et al. |
| 2006/0074784 A1 | 4/2006 | Brown |
| 2006/0122921 A1 | 6/2006 | Comerford et al. |
| 2006/0143091 A1 | 6/2006 | Yuan et al. |
| 2006/0163349 A1 | 7/2006 | Neugebauer |
| 2006/0165060 A1 | 7/2006 | Dua |
| 2006/0175400 A1 | 8/2006 | Sweeney et al. |
| 2006/0206376 A1 | 9/2006 | Gibbs et al. |
| 2006/0223556 A1 | 10/2006 | Xu et al. |
| 2006/0224450 A1 | 10/2006 | Moon |
| 2006/0237528 A1 | 10/2006 | Bishop et al. |
| 2007/0013479 A1 | 1/2007 | Goel et al. |
| 2007/0050255 A1 | 3/2007 | Hobbs et al. |
| 2007/0073589 A1 | 3/2007 | Vergeyle et al. |
| 2007/0125840 A1 | 6/2007 | Law et al. |
| 2007/0156517 A1 | 7/2007 | Kaplan et al. |
| 2007/0179843 A1 | 8/2007 | Eichenbaum et al. |
| 2007/0186105 A1 | 8/2007 | Bailey et al. |
| 2007/0192182 A1 | 8/2007 | Monaco et al. |
| 2007/0192183 A1 | 8/2007 | Monaco et al. |
| 2007/0197261 A1 | 8/2007 | Humbel |
| 2007/0203791 A1 | 8/2007 | Kohl et al. |
| 2007/0254712 A1 | 11/2007 | Chitti |
| 2007/0266130 A1 | 11/2007 | Mazur et al. |
| 2007/0271144 A1 | 11/2007 | Winquist |
| 2007/0276727 A1 | 11/2007 | Thibedeau |
| 2007/0276730 A1 | 11/2007 | Lee et al. |
| 2007/0276734 A1 | 11/2007 | Littman |
| 2008/0005104 A1 | 1/2008 | Flake et al. |
| 2008/0010114 A1 | 1/2008 | Head |
| 2008/0010148 A1 | 1/2008 | Knibiehly et al. |
| 2008/0011837 A1 | 1/2008 | Wesley |
| 2008/0015938 A1 | 1/2008 | Haddad et al. |
| 2008/0017704 A1 | 1/2008 | VanDeburg et al. |
| 2008/0021772 A1 | 1/2008 | Aloni et al. |
| 2008/0035724 A1 | 2/2008 | Vawter |
| 2008/0040219 A1 | 2/2008 | Kim et al. |
| 2008/0040229 A1 | 2/2008 | Gholston |
| 2008/0041936 A1 | 2/2008 | Vawter |
| 2008/0041937 A1 | 2/2008 | Vawter |
| 2008/0048022 A1* | 2/2008 | Vawter .................. 235/380 |
| 2008/0059374 A1 | 3/2008 | Gangi |
| 2008/0262928 A1* | 10/2008 | Michaelis .................. 705/14 |
| 2009/0170483 A1* | 7/2009 | Barnett et al. ............. 455/414.2 |
| 2009/0177530 A1* | 7/2009 | King et al. .................. 705/10 |
| 2009/0276300 A1* | 11/2009 | Shaw et al. ................. 705/14.1 |
| 2010/0096450 A1* | 4/2010 | Silverbrook et al. ......... 235/380 |

FOREIGN PATENT DOCUMENTS

| | | |
|---|---|---|
| JP | 2001-076058 A | 3/2001 |
| JP | 2005222435 A | 8/2005 |
| KR | 10-2005-0021612 A | 3/2005 |
| WO | WO 2005101863 A2 | 10/2005 |
| WO | WO 2006026600 A2 | 3/2006 |
| WO | WO 2006041514 A1 | 4/2006 |
| WO | WO 2006060849 A1 | 6/2006 |
| WO | WO 2006069445 A1 | 7/2006 |

OTHER PUBLICATIONS

Lindsay, Jeff et al., "Retail RFID Systems without Smart Shelves," dated Nov. 7, 2003, found on IP.com, 12 pages.

Miriyala, Srinivas, "Smart Coupon Dispenser," obtained from IP.com, Motorola Inc. Aug. 1, 2001, 4 pages.

Reade, Walter et al., "RFID Systems for Enhanced Shopping Experiences," article dated Nov. 10, 2003, found on IP.com, 14 pages.

Roussos, George, "Enabling RFID in Retail," Birbeck College, Univ. of London, Mar. 2006, vol. 39, Issue 3, pp. 25-30.

Schaller, Andreas, "Motorola's NFC Activities," marketing Powerpoint presentation, Motorola Labs Europe, 2007, 23 slides total.

Springer, Louise et al., "RFID Enabled Systems for Quickly Locating Objects in Stores," 2005, obtained from IP.com, Kimberly-Clark Corporation, Neenah, Wisconsin, 2 pages.

PCT International Search Report and Written Opinion dated Dec. 28, 2009; International Application No. PCT/US2009/049830, 12 pages.

\* cited by examiner

CUSTOMER PRE-SELECTED ELECTRONIC COUPONS

BACKGROUND

Consumers are now able to interact with merchandisers in stores using near field communication (NFC) devices. An example of the NFC device is the MasterCard PayPass™. Another example would be a mobile phone enabled to receive and transmit data through an NFC chip/antenna. Generally, the NFC devices allow the consumer to pass the NFC device over a sensor and complete an electronic payment automatically. The proximity for data transmission is generally related to the strength of the signal, from a few inches to multiple meters. Other uses include parking payments and redeeming coupons with the NFC device.

A customer generally owns a mobile device that may be NFC capable. The user can download one or more electronic coupons to the mobile device. Once in a store, the customer can redeem the coupons for products that the customer is purchasing. Unfortunately, customers often forget which coupons that they downloaded. As such, the customer may not purchase the product that matches the coupon or may not purchase the product at all. The customer has no user friendly method of organizing the coupons for use in the store.

It is in light of these and other considerations that the present application is being presented.

BRIEF SUMMARY

Embodiments presented in the present application provide novel systems and methods for managing electronic coupons. In embodiments, the user uploads one or more coupons into a mobile device. While shopping, the mobile device receives communications from one or more NFC sensors/transmitters, which may be continually transmitting product information, associated with one or more products in one or more product displays. The mobile device can determine from product information in the communication from the NFC sensors/transmitters to which product the communication applies. The mobile device can then search for one or more uploaded coupons that apply to the one or more products. In embodiments, the mobile device alerts the user when one or more of the coupons apply.

This summary is not meant to limit the claims in any manner. Rather, this summary provides only a few of the possible embodiments. And these embodiments are not meant to define the scope of the application, but, rather, the claims attached hereto define the invention.

BRIEF DESCRIPTION OF THE DRAWINGS

The embodiments of the present disclosure are described in conjunction with the appended figures.

DETAILED DESCRIPTION

Embodiments presented herein relate to a mobile device providing a user with a novel management system for electronic coupons. In embodiments, a user downloads one or more electronic coupons into the mobile device and stores the coupons in a database. The one or more coupons may be identified by an identifier. When shopping in a merchant facility, embodiments of the mobile device receives one or more communications from one or more near field communication (NFC) sensors or transmitters. In embodiments, NFC sensors/transmitters do not need to sense the presence of an NFC device to transmit information, but the NFC sensors/transmitters may continually transmit. The NFC sensors/transmitters may have a limited transmission range, but the mobile device can receive stronger signals over greater distances. The NFC sensors/transmitters can be associated with or attached to a product in a product display. Thus, the communication from the NFC sensor/transmitter to the mobile device relates to the product attributes. In embodiments, the mobile device parses the communication to extract an identifier. The mobile device can search the coupon database to determine if an electronic coupon is stored for the product. If a coupon does exist, the mobile device may present an alert to the user and provide information as to where the product is located in the product display.

Figure 1:
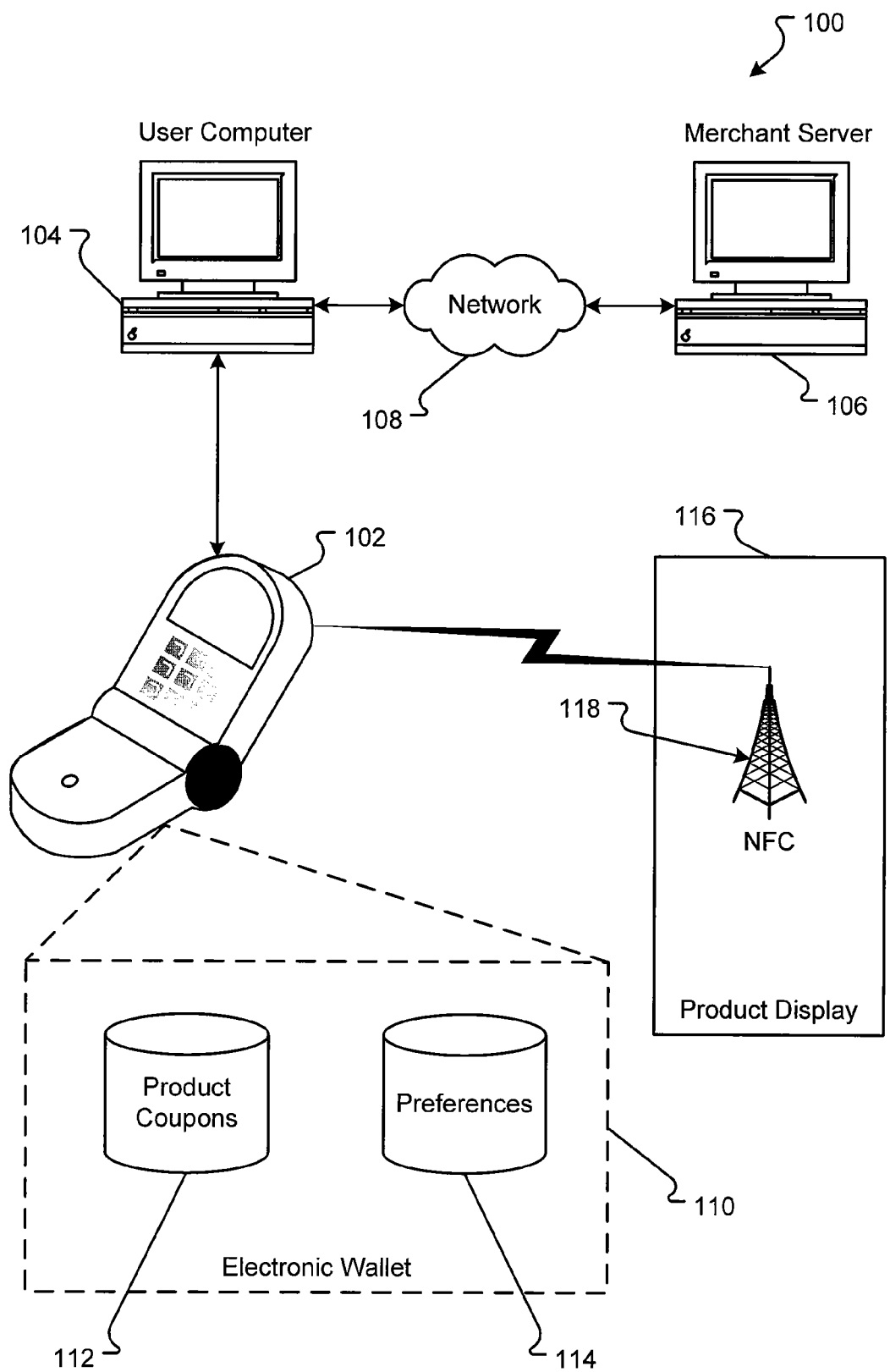
FIG. 1 is a block diagram of an embodiment of a mobile device operable to redeem coupons at a merchant facility.

An embodiment of a system 100 providing for the management of electronic coupons is shown in FIG. 1. The system 100, in embodiments, comprises a mobile device 102, which is a device for communicating information to and from the mobile device 102 and/or user, a product display 116, a user computer 104, and/or a merchant server 106. Examples of mobile devices 102 can include cell phones, personal digital assistants, laptop computers, etc. In embodiments, the mobile device 102 comprises an NFC component for communicating with one or more NFC sensors/transmitters 118 of one or more product displays 116.

The mobile device 102, in embodiments, includes one or more communication devices or components to communicate with a user computer 104. The user computer 104 can be any computer (e.g., personal computer, laptop, etc.) that may communicate with a network 108 and to a merchant server 106. In embodiments, the mobile device 102 may download or retrieve one or more coupons from the user computer 104. In embodiments, the user computer 104 downloads the one or more coupons from the merchant server 106 over the network 108. The one or more coupons are then uploaded into the merchant device 102.

The mobile device 102 can comprise one or more databases or electronic wallets 110. In embodiments, the databases 110 comprises a product coupons database 112 and/or a user preferences database 114, also referred to simply as a preferences database 114. In embodiments, the mobile device 102 stores one or more electronic coupons to the product coupons database 112 and one or more user preferences to the preferences database 114. As illustrated in FIG. 1, the various components of mobile device 102 are held within a housing.

Figure 2:
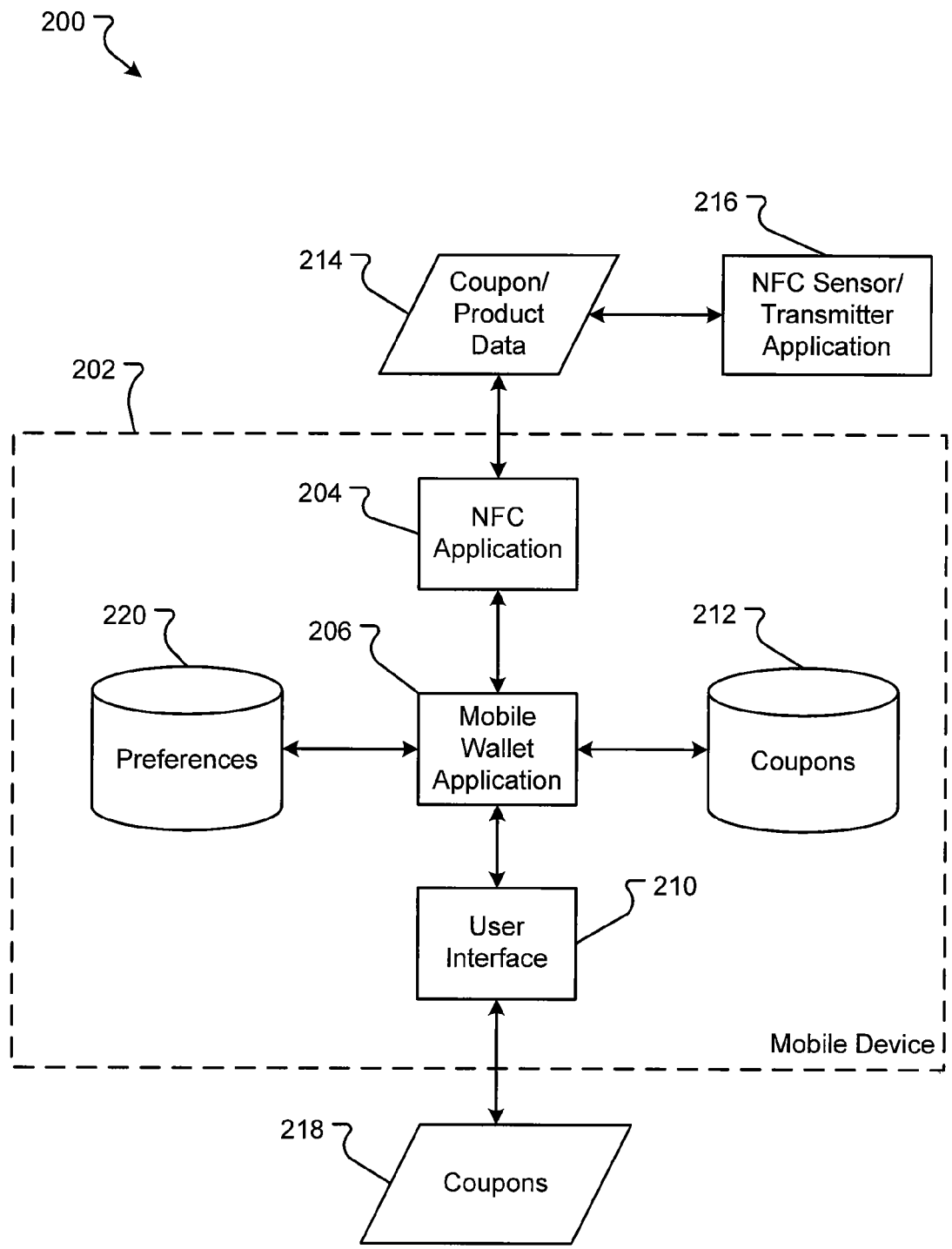
FIG. 2 is a block diagram of an embodiment of a hardware and/or software system for a mobile device comprising a payment user interface device.

An embodiment of a mobile device 202 operable to manage electronic coupons is shown in FIG. 2. The mobile device 202 may comprise hardware, software, or a combination of hardware and software. One or more software applications may be executed in a processor, the user interface 210, and/or the NFC application 204. In embodiments, the mobile device 202 communicates in a retail environment 200 with an NFC sensor/transmitter application 216. The NFC sensor/transmitter application 216 can be a radio frequency identification device (RFID) or other type device that can send, receive, or send and receive information associated with a product. For example, the NFC sensor/transmitter application 216 can be the Felica contactless smart card platform offered by Sony®.

In embodiments, the mobile device 202 includes an NFC component/application 204. The NFC application 204 may be any circuit or device for communicating with the NFC sensor/transmitter application 216. For example, the NFC application 204 can be the PN531 transmission module offered by NXP Semiconductors, Eindhoven, Netherlands. In embodiments, the NFC application 204 receives coupon, product data, and/or communications 214 from the NFC sensor/transmitter application 216. The communications 214 can include coupon and/or product data. In embodiments, the mobile device 202 is brought into proximity with the NFC sensor/transmitter application 216 to communicatively couple the NFC application 204 and the NFC sensor/transmitter application 216. Proximity may be defined by the NFC system being used and is known in the art. In one embodiment, proximity may be several feet. In another embodiment, the proximity requires a consumer to "tap," which may mean nearly touching, the NFC device to the NFC sensor transmitter. Thus, NFC devices that may usually tap the sensor are operable to function in the embodiments presented herein.

Figure 6:
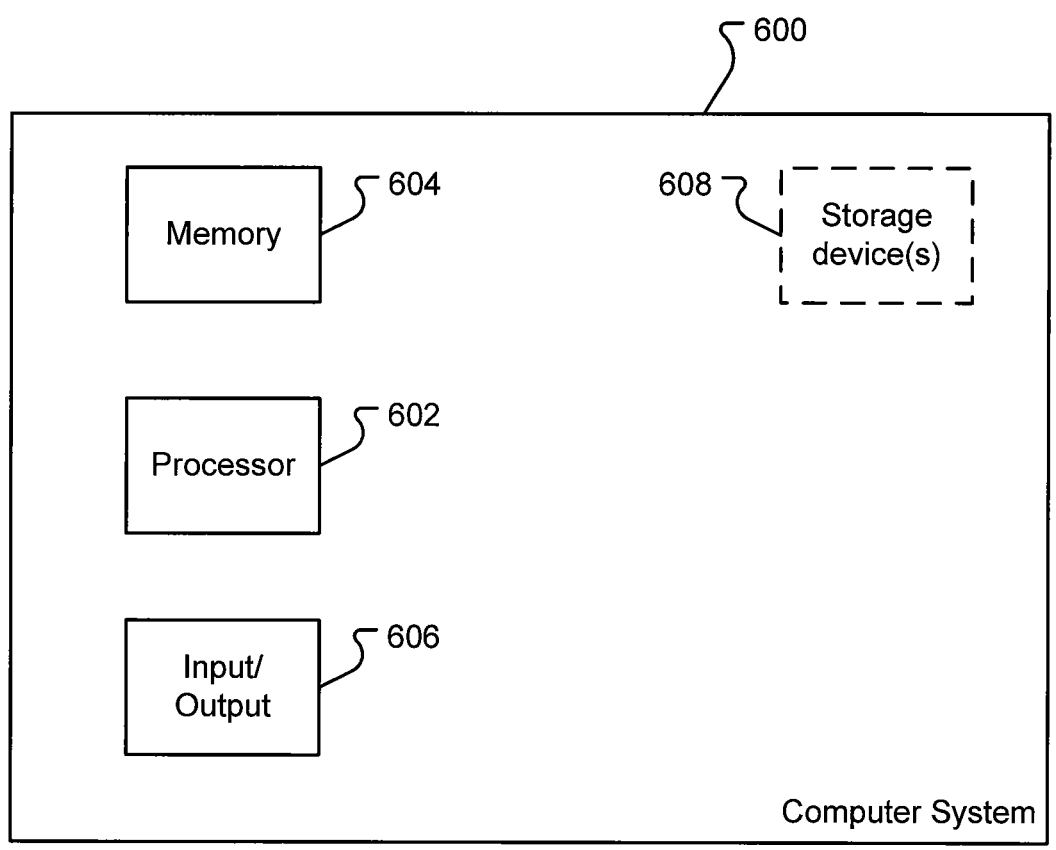
FIG. 6 is a block diagram of an embodiment of a computer system operable as a mobile device comprising a payment user interface device.

The mobile device 202 can also include a processor, as explained in conjunction with FIG. 6, which can execute a mobile wallet application 206. The processor is any processor or circuit, either in hardware, software, or hardware and software, that controls the functions of the mobile device 202. For example, the processor is an Intel PXA800F cellular processor. The processor communicates with the NFC application 204. In embodiments, components communicate with each other through the exchange of information either through a wired medium or a wireless interface. One skilled in the art will recognize methods of facilitating communications between components, such as circuit connections. The mobile wallet application 206 can include software operable to receive and/or translate signals received by the NFC application 204, store, retrieve, and manipulate mobile wallet information 212 and/or 220, translate and/or send information to the NFC application 204 for communication to the NFC sensor/transmitter application 216.

In embodiments, the mobile device 202 also includes a user interface 210. The user interface 210 comprises any hardware or software operable to present information to a user on a display of the mobile device 202 or receive selections of user interface devices by the user. The user interface 210 can communicate with the processor and the mobile wallet application 206 to send signals indicative of selections of user interface devices to the mobile wallet application 206. In embodiments, the processor and mobile wallet application 206 can create signals to be rendered by the user interface 210 on a display.

The mobile device 202 may also include a storage medium, as explained in conjunction with FIG. 6. The storage medium can include a database or other data store that stores mobile wallet information. In embodiments the mobile wallet information includes a coupons database 212 and/or a preferences database 220. Coupons database 212 can include one or more items of information associated with one or more electronic coupons. An embodiment of a coupons database 212 is described in conjunction with FIG. 3A. Preferences database 220 can include one or more items of information associated with one or more user preferences. An embodiment of a preferences database 220 is described in conjunction with FIG. 3B.

In operation, the user, in embodiments, stores electronic coupons in a coupons database 212 and/or user preferences in a preferences database 220. The mobile device 202 is presented in proximity to the NFC sensor/transmitter application 216 while in a merchant facility, such as a retail store. The NFC sensor/transmitter application 216 transmits coupon and/or product data to the NFC application 204 of the mobile device 202. The mobile wallet application 206, in embodiments, parses the communication to extract an identifier or other information. The mobile wallet application 206 can then search the coupons database 212 and/or the preferences database 220. If the mobile wallet application 206 locates a product in the user preferences 220 or an electronic coupon in the coupons database 212, the mobile wallet application 206 may alert the user that an electronic coupon is available for a product located in a near-by product display. The mobile wallet application 206, in embodiments, sends a signal to the user interface 210 to render an alert for the user. The alert can be a visual indication (e.g., a screen display), an audio indication (e.g., a beep or other audio signal), or a physical indication (e.g., vibration of the mobile device). The user may interact with the user interface 210 after the alert. Then, the user interface 210 may present coupon information 218, for example, the discount available with the coupon, the product, the location of the product in the product display, etc.

Figure 3A:
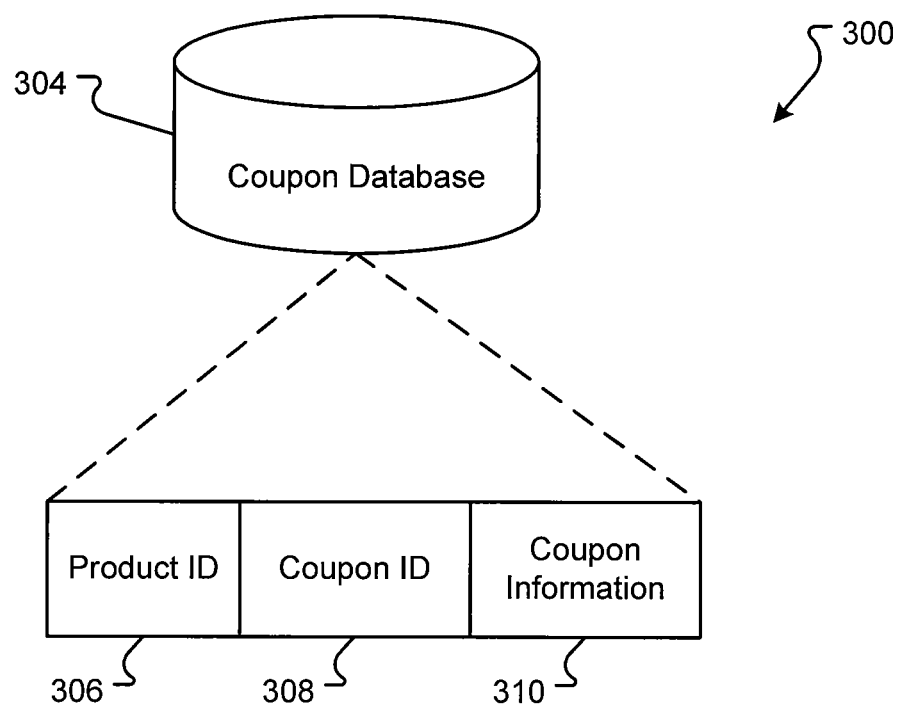
FIGS. 3A & 3B are block diagrams of embodiments of a coupon database and a preferences database.
Figure 3B:
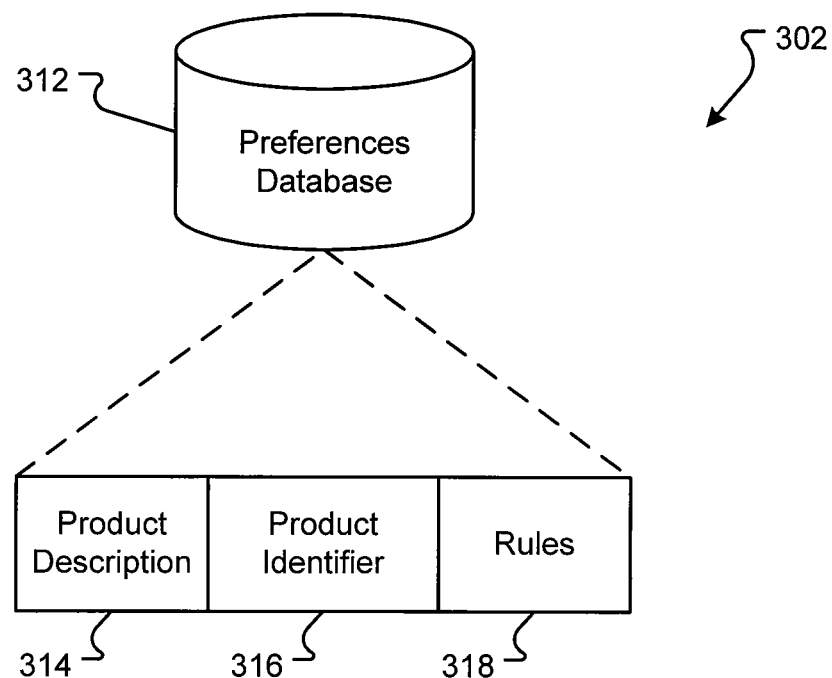

Embodiments of a coupons database system 300 and a preferences database system 302 are shown in FIGS. 3A and 3B, respectively. In embodiments, the coupons database 304 stores one or more items of information associated with one or more electronic coupons. The information stored by the coupons database 304 can force or allow a processor to execute different functions for retrieving electronic coupons and/or alerting a user to the presence of the one or more electronic coupons. In embodiments, the coupons database 304 includes one or more fields.

The coupons database 304 can include a product identifier (ID) field 306. The product ID field 306, in embodiments, includes one or more identifiers for a product. The identifier may be a product SKU, a product name, a product stocking number, a universal product code (UPC) code, etc. The product ID field 306 can allow a mobile device 202 (FIG. 2) to search for electronic coupons by product. For example, an NFC sensor/transmitter application 216 (FIG. 2) provides a product ID in the product data 214 (FIG. 2). The mobile wallet application 206 (FIG. 2) can search the coupons database 304 for the product ID in the product ID field 306 to locate electronic coupons.

In embodiments, the coupons database 304 also includes a coupon ID field 308. The coupon ID field 308 can include one or more identifiers for one or more electronic coupons. For example, a first coupon has a first coupon identifier and a second coupon has a second coupon identifier. Coupon IDs 308 can allow a product, identified by the product ID 306, to have two or more associated electronic coupons. For example, a can of soup may have a 25%-off coupon and a buy-one-get-one-free coupon. In other embodiments, a coupon has multiple associations with different products. For example, a Coke coupon may apply to any Coke product, to any Coke Soda, or to any Coke Diet Soda. The coupon ID field 306, in embodiments, allows the mobile device 202 (FIG. 2) to locate specific electronic coupons in the coupons database 304. For example, the NFC sensor/transmitter application 216 (FIG. 2) sends a coupon identifier in the coupon data communication 214 (FIG. 2). In this example, one store may be running one promotion for a product while a second store is running a different promotion. As such, the specific promotion may be identified. The mobile wallet application 206 (FIG. 2) can search the coupons database 304 for the coupon ID in the coupon ID field 308 to locate the associated electronic coupon. In other embodiments, the search may encompass searching for the coupon's start and/or expiration dates, a time of day, etc.

The coupon database 304, in embodiments, also includes a coupon information field 310. The coupon information field 310 can include one or more items of information regarding the coupon or the promotion. For example, the coupon information field 310 includes the amount of the discount, the expiration date of the coupon, where the coupon can be redeemed, the product for which the coupon is associated, etc. In embodiments, the coupon information field 310 provides information to the mobile wallet application 206 (FIG. 2) to present to the user interface 210 (FIG. 2) for an alert 218 (FIG. 2) displayed to the user.

In embodiments, the preferences database 312 stores one or more items of information associated with user preferences related to one or more products. The information stored by the preferences database 312 can force or allow a processor to execute different functions for determining which electronic coupons may apply to the user and/or alerting a user to the presence of the one or more electronic coupons. The preferences database 312 can include one or more fields.

The preferences database 312 may include a product description field 314. In embodiments, the product description field 314 includes one or more items of information that can identify a product. The product information can be used to determine a product in the user preferences that has an associated coupon available. The electronic coupon may not be presented until the user is in the store. As such, the mobile device 202 (FIG. 2) can use the product information to associate the product with an offered coupon. The product description field 314 may not include some information such as the SKU or UPC, which may not be known to the customer. However, the product description field 314 can include the type of product (e.g., can of tomatoes), product name, manufacturer name, size of the product (e.g., 14 oz. can of tomatoes), etc. An NFC sensor/transmitter application 216 (FIG. 2) provides product information in the product data 214 (FIG. 2). The mobile wallet application 206 (FIG. 2) can search the preferences database 312 for the product information in the product description field 314 to determine if a user may be interested in an offered coupon.

The coupons database 304 can also include a product identifier (ID) field 316. The product ID field 316, in embodiments, includes one or more identifiers for a product. In embodiments, the identifier may be a product stock keeping unit (SKU), a product name, a product stocking number, a universal product code (UPC) code, etc. The product ID field 316 can allow a mobile device 202 (FIG. 2) to search for electronic coupons by product ID provided by the NFC sensor/transmitter application 216 (FIG. 2). For example, an NFC sensor/transmitter application 216 (FIG. 2) provides a product ID in the product data 214 (FIG. 2). The mobile wallet application 206 (FIG. 2) can search the coupons database 304 for the product ID in the product ID field 316 to locate electronic coupons.

In embodiments, the preferences database 312 also includes one or more rules in a rules field 318. The user rules can be predetermined by the user and downloaded to the mobile device 202 (FIG. 2). For example, the user can create one or more rules in a user computer 104 (FIG. 1) and download the rules to the mobile device 102 (FIG. 1). Rules can be any logic that allows the mobile device 202 (FIG. 2) to determine if a user may be interested in an offered coupon. For example, the user may set a rule that he or she would like to see any coupon for canned tomatoes. In another embodiment, the user may specify that he or she wants to see only coupons for 14 oz. cans of tomatoes that are buy-one-get-one-free coupons. Thus, a user can set the specificity of the rules to be used by the mobile device 202 (FIG. 2). In alternative embodiments, the user may specify how to prioritize two or more coupons that apply to the same product. For example, the user may specify that coupons with the highest redeemable value have the highest priority or that coupons for a a particular brand have the highest priority. In alternative embodiments, the user creates a shopping list that is downloaded into the rules field 318. The mobile device 202 (FIG. 2) can then review the shopping list to determine if a coupon is being offered for a product listed in the shopping list.

Figure 4:
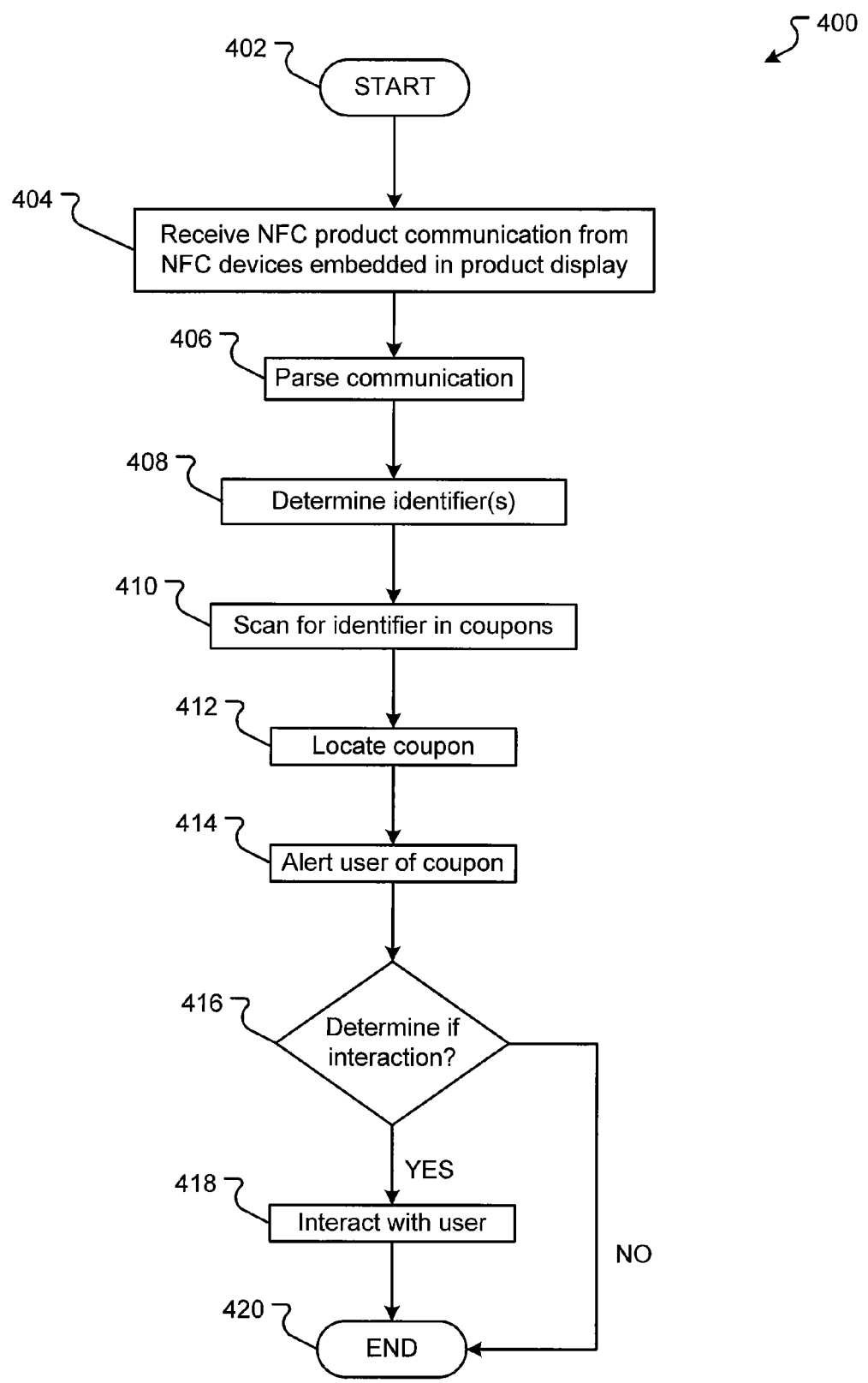
FIG. 4 is a flow diagram of an embodiment of a method for redeeming coupons at a merchant facility.

An embodiment of a method 400 for managing one or more electronic coupons with a mobile device is shown in FIG. 4. In embodiments, the method 400 generally begins with a START operation 402 and terminates with an END operation 420. The steps shown in the method 400 may be executed in a computer system as a set of computer executable instructions. While a logical order is shown in FIG. 4, the steps shown or described can, in some circumstances, be executed in a different order than presented herein.

Receive operation 404 receives a communication from a product display. In embodiments, the mobile device 202 (FIG. 2) receives an NFC communication 214 (FIG. 2) from an NFC sensor/transmitter 118 (FIG. 1) located on and associated with a product display 116 (FIG. 1) in a merchant facility. The NFC communication 214 (FIG. 2) may be associated with one or more product located within the product display 116 (FIG. 1). The communication 214 (FIG. 2) may include information about a product and/or about an electronic coupon. In embodiments, the NFC component executing an NFC application 204 (FIG. 2) receives the communication 214 (FIG. 2). The NFC application 204 (FIG. 2) may then forward the message to the mobile wallet application 206 (FIG. 2).

Parse operation 406 parses the communication. In embodiments, the NFC application 204 (FIG. 2) and/or the mobile wallet application 206 (FIG. 2) parses the communication 214 (FIG. 2). The communication can include one or more portions. The mobile wallet application 206 (FIG. 2) may parse the communication 214 (FIG. 2) to identify an identifier or some other information with which the mobile wallet application 206 (FIG. 2) can search the coupons database 212 (FIG. 2). The portions of the communication 214 (FIG. 2) may be assembled into a predetermined format according to an established protocol. The mobile wallet application 206 (FIG. 2), in embodiments, separates the message into portions and can then read the information from the one or more portions that may be pertinent to search the database.

Determine operation 408 determines an identifier in the communication. In embodiments, the mobile wallet application 206 (FIG. 2) reads data from the parsed communication 214 (FIG. 2). The mobile wallet application 206 (FIG. 2) can identify one or more identifiers or other information in the communication 214 (FIG. 2) that may be used to search the coupons database 212 (FIG. 2). Upon identifying the information, the mobile wallet application 206 (FIG. 2), in embodiments, extracts the pertinent information from the communication 214 (FIG. 2).

Scan operation 410 scans for the identifier in the electronic coupons, receiving one or more coupons from a merchant server. The mobile wallet application 206 (FIG. 2) can scan or search the coupons database 212 (FIG. 2). In embodiments, the identifier is a product identifier, and the mobile wallet application 206 (FIG. 2) scans the product ID field 306 (FIG. 3A) for one or more entries in the coupons database 304 (FIG. 3A). In other embodiments, the identifier is the coupons ID or coupon information in which the mobile wallet application 206 (FIG. 2) scans the coupon ID field 308 or the coupon information field 310 (FIG. 3A).

In embodiments, the user has selected one or more coupons from a merchant server 106 (FIG. 1). The user requests the coupons using the user computer 104 (FIG. 1). The electronic coupons can be downloaded to the user computer 104 (FIG. 1) from the merchant server 106 (FIG. 1) over the network 108 (FIG. 1). The user may then download the stored coupons to the mobile device 102 (FIG. 1). The mobile device 102 (FIG. 1) can store the coupons in the coupons database 212 (FIG. 2). Each electronic coupons may have a separate entry stored in the coupons database 304 (FIG. 3A), with each entry possibly including the product ID field 306 (FIG. 3A), the coupon ID field 308 (FIG. 3A), and/or the coupon information field 310 (FIG. 3A).

Locate operation 412 locates an electronic coupon. In embodiments, the mobile wallet application 206 (FIG. 2) locates an entry in the coupons database 304 (FIG. 3A) having an identifier that is the same as an identifier extracted from the communication 214 (FIG. 2). The information in the database entry can be read by the mobile wallet application 206 (FIG. 2).

Alert operation 414 alerts the user of the electronic coupon. In embodiments, the mobile wallet application 206 (FIG. 2) creates a signal to the user interface 210 (FIG. 2) to alert the user about the existence of the coupon. The user interface 210 (FIG. 2) renders the signal into a user interface display or action. For example, the user interface 210 (FIG. 2) may create an audible signal alerting the user to view the display. The display may contain information about the coupon and the product as provided by the mobile wallet application 206 (FIG. 2). The display can include one or more items of information from the coupons database 304 (FIG. 3A) and/or the communication 214 (FIG. 2).

Determine operation 416 determines if the user interacts with the mobile device in response to the alert. The mobile wallet application 206 (FIG. 2) can determine if the user interacts with the mobile device 202 (FIG. 2) in response to the alert. In embodiments, the user interface 210 (FIG. 2) may receive a signal selecting one or more user interface devices, for example, a key on a keypad, an icon on a display screen, etc. The user interface 210 (FIG. 2) sends the signal to the mobile wallet application 206 (FIG. 2). If a signal from the user interface 210 (FIG. 2) is received by the mobile wallet application 206 (FIG. 2), the mobile wallet application 206 (FIG. 2) determines that the user desires to interact with the mobile device 202 (FIG. 2). If no signal is received within a predetermined time (e.g., one minute) or before another communication 214 (FIG. 2) is received for another product, the mobile wallet application 206 (FIG. 2) may determine that the user does not desire to interact with the mobile device 202 (FIG. 2). If the user does desire to interact, the method flows YES to interact operation 418. If the user does not desire to interact, the method flows NO to terminate operation 420, which functionally means the mobile device 202 (FIG. 2) ignores and discards the communication 214 (FIG. 2).

Interact operation 418 interacts with the user. If the mobile wallet application 206 (FIG. 2) receives a signal from the user interface device associated with the coupon, the mobile wallet application 206 (FIG. 2) begins an interaction with the user. In embodiments, the mobile wallet application 206 (FIG. 2) sends information to the user interface 210 (FIG. 2) to render one or more subsequent displays. The displays may include questions that require user input or require the user to make some selection. For example, the user may select to accept the coupon by selecting one or more user interface devices or acknowledge the alert for the coupon. In other embodiments, the user is provided with additional information. For example, the user may ask for or the mobile wallet application 206 (FIG. 2) automatically provides a location of a product related to the coupon. Thus, the user interface 210 (FIG. 2) displays a shelf location and proximate location on the shelf for the product (e.g., third shelf from the bottom, four feet from end of aisle). More or different information may be provided by the mobile wallet application 206 (FIG. 2) and in response to one or more user actions with the mobile device 202 (FIG. 2).

Figure 5:
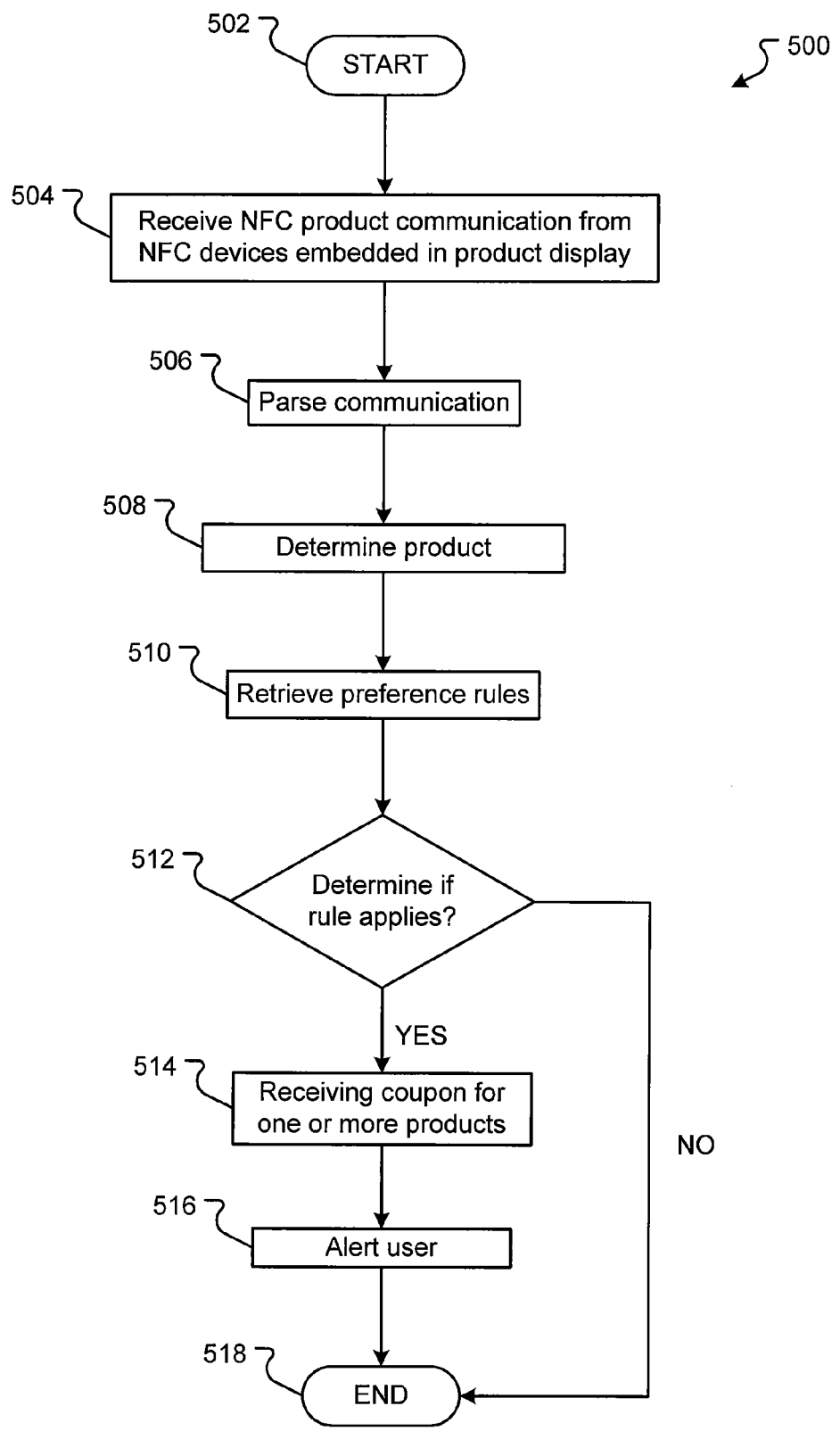
FIG. 5 is a flow diagram of another embodiment of a method for redeeming coupons at a merchant facility.

Another embodiment of a method 500 for managing one or more electronic coupons with a mobile device is shown in FIG. 5. In embodiments, the method 500 generally begins with a START operation 502 and terminates with an END operation 518. The steps shown in the method 500 may be executed in a computer system as a set of computer executable instructions. While a logical order is shown in FIG. 5, the steps shown or described can, in some circumstances, be executed in a different order than presented herein.

Receive operation 504 receives a communication from a product display. In embodiments, the mobile device 202 (FIG. 2) receives an NFC communication 214 (FIG. 2) from an NFC sensor/transmitter 118 (FIG. 1) located on and associated with a product display 116 (FIG. 1) in a merchant facility. The NFC communication 214 (FIG. 2) may be associated with one or more products located within the product display 116 (FIG. 1). The communication 214 (FIG. 2) may include information about a product. In embodiments, the NFC component executing an NFC application 204 (FIG. 2) receives the communication 214 (FIG. 2). The NFC application 204 (FIG. 2) may then forward the message to the mobile wallet application 206 (FIG. 2).

Parse operation 506 parses the communication. In embodiments, the NFC application 204 (FIG. 2) and/or the mobile wallet application 206 (FIG. 2) parses the communication 214 (FIG. 2). The communication can include one or more portions. The mobile wallet application 206 (FIG. 2) may parse the communication 214 (FIG. 2) to identify information with which the mobile wallet application 206 (FIG. 2) can search the preferences database 220 (FIG. 2). The portions of the communication 214 (FIG. 2) may be assembled into a predetermined format according to an established protocol. The mobile wallet application 206 (FIG. 2), in embodiments, separates the message into the portions and can then read the information from the one or more portions that may be pertinent to search the database.

Determine operation 508 determines information in the communication 214 (FIG. 2). In embodiments, the mobile wallet application 206 (FIG. 2) reads data from the parsed communication 214 (FIG. 2). The mobile wallet application 206 (FIG. 2) can identify one or more items of information in the communication 214 (FIG. 2) that may be used to search the preferences database 220 (FIG. 2). Upon identifying the information, the mobile wallet application 206 (FIG. 2), in embodiments, extracts the pertinent information from the communication 214 (FIG. 2).

Retrieve operation 510 retrieves one or more preference rules. In embodiments, the mobile wallet application 206 (FIG. 2) reads rules from the preferences database 220 (FIG. 2). The preference rules may be a predetermined set of rules that provide logic to the mobile wallet application 206 (FIG. 2) in evaluating the communication. For example, the preference rules may be a shopping list from which the mobile wallet application 206 (FIG. 2) can compare the coupons offered to the product listed. In embodiments, the use has loaded or created the shopping list into the mobile wallet application 206 (FIG. 2). The shopping list can be used to identify coupons being offered at the product display. Thus, the identification of coupons occurs in the mobile wallet application 206 (FIG. 2) by comparing the list to offers. In embodiments, the user has created and stored the preference rules for retrieval.

Determine operation 512 determines if the one or more preference rules apply. The mobile wallet application 206 (FIG. 2) can review the one or more preference rules against the extracted information. For example, the mobile wallet application 206 (FIG. 2) can determine if the product description in the communication 214 (FIG. 2) is the same as the product description in a shopping list. In another example, the rule may state that only coupons offering a discount of 25% or more should be accepted. The mobile wallet application 206 (FIG. 2) can check the amount of the discount on an offered coupon against the rule. If the rule applies, the method flows YES to receive operation 514. If the rule does not apply, the method flows NO to terminate operation 518, which functionally means the mobile device 202 (FIG. 2) ignores and discards the communication 214 (FIG. 2).

Receive operation 514 receives the coupon. In embodiments, the mobile wallet application 206 (FIG. 2) sends a request to the NFC application 204 (FIG. 2) to request the coupon. The NFC application 204 (FIG. 2) can create a message to send to the NFC sensor/transmitter application 216 (FIG. 2) to request the coupon. In an alternative embodiment, the NFC application 204 (FIG. 2) receives the coupon that was already being sent without requesting the coupon. The NFC application 204 (FIG. 2), in embodiments, sends the coupon to the mobile wallet application 206 (FIG. 2). The mobile wallet application 206 (FIG. 2) then stores the coupon in the coupons database 212 (FIG. 2) for later redemption.

Alert operation 516 alerts the user to the electronic coupon. In embodiments, the mobile wallet application 206 (FIG. 2) creates a signal to the user interface 210 (FIG. 2) to alert the user about the existence of the coupon. The user interface 210 (FIG. 2) renders the signal into a user interface display or action. For example, the user interface 210 (FIG. 2) may create an audible signal alerting the user to view the display. The display may contain information about the coupon and the product as provided by the mobile wallet application 206 (FIG. 2). The display can include one or more items of information from the preferences database 312 (FIG. 3B) and/or the communication 214 (FIG. 2).

If the mobile wallet application 206 (FIG. 2) receives a signal from the user interface device associated with the coupon, the mobile wallet application 206 (FIG. 2) begins an interaction with the user. In embodiments, the mobile wallet application 206 (FIG. 2) sends information to the user interface 210 (FIG. 2) to render one or more subsequent displays. The displays may include questions that require user input or require the user to make some selection. For example, the user may select to accept the coupon by selecting one or more user interface devices or acknowledge the alert for the coupon. In other embodiments, the user is provided with additional information. For example, the user may ask for or the mobile wallet application 206 (FIG. 2) automatically provides a location of a product related to the coupon. Thus, the user interface 210 (FIG. 2) displays a shelf location and proximate location on the shelf for the product (e.g., third shelf from the bottom, four feet from end of aisle). More or different information may be provided by the mobile wallet application 206 (FIG. 2) and in response to one or more user actions with the mobile device 202 (FIG. 2).

An embodiment of a computer system 600 operable to function as one or more components or systems described herein, such as the mobile device 202 (FIG. 2), user computer 104 (FIG. 1), and/or merchant server 106 (FIG. 1) is shown in FIG. 6. In embodiments, the computer system 600 comprises a processor 602 (which may be the same or similar to the processor described in conjunction with FIG. 2) for executing one or more instructions. The instructions may be software stored on computer-readable medium, such as memory 604 (which may be the same or similar to the memory described in conjunction with FIG. 2) or storage device(s) 608. The instructions may perform a method, such as methods described in conjunction with FIGS. 4 and 5. The computer system, in embodiments, also includes Input/Output (I/O) devices or components 606. The I/O components 606 can include network interface cards, routers, hardware for communicating with peripherals (e.g., printers, monitors, etc.), software drivers, NFC components, or any other hardware or software needed to receive or send information as described herein.

The computer system 600 can also comprise software elements located within the working memory 604, including an operating system and/or other code, such as one or more application programs, which may comprise computer programs as described herein, and/or may be designed to implement methods and/or configure systems, as described herein. Merely by way of example, one or more procedures described with respect to the method(s) discussed above might be implemented as code and/or instructions executable by a computer (and/or a processor within a computer).

A set of these instructions and/or code might be stored on a computer-readable storage medium, such as the storage device(s) 608 described above. In some cases, the storage medium might be incorporated within a computer system, such as the database 212 and/or 220 (FIG. 2). In other embodiments, the storage medium might be separate from the computer system 600 (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

While various aspects of embodiments of the disclosure have been summarized above, the detailed description illustrates exemplary embodiments in further detail to enable one of skill in the art to practice the disclosure. In the description, for the purposes of explanation, numerous specific details were set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Specific details are given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) 600 may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

A number of variations and modifications of the disclosure can also be used. For example, a mobile wallet application 206 (FIG. 2) may be able to determine which coupons apply or receive coupons that match preference rules 114 (FIG. 1) and/or 220 (FIG. 2). Then, at some future time, such as when the customer is going to purchase the products, the mobile wallet application 206 (FIG. 2) sends a general alert about all of the coupons 218 (FIG. 2). In still another embodiment, the mobile wallet application 206 (FIG. 2) can automatically receive and store any coupon 218 (FIG. 2) that matches a preference rule 220 (FIG. 2).

In another embodiment, an encryption key is transmitted from the NFC sensor/transmitter. The user would need to enter a key to decrypt the message. Thus, the user would have to actively accept the messages. Further, the messages would be confidential such that no one would know what messages the user accepts.

In yet another embodiment, a shopping list is created in or loaded onto the mobile device 102 (FIG. 1). As the consumer walks through the store, the mobile device 102 (FIG. 1) receives signals about one or more products from one or more NFC sensor/transmitters 216 (FIG. 2). The signals identify the products in proximity to the one or more NFC sensor/transmitters 216 (FIG. 2). The products are compared to shopping list. If a product appears on the shopping list, the mobile device 102 (FIG. 1) provides a warning or alert to the consumer that a product on the shopping list is in proximity. Rather than provide or alert the consumer to a coupon, the mobile device 102 (FIG. 1) simply alerts the consumer that a product desired and on the shopping list is near by. The consumer may be provided the location of the product (e.g., middle of the aisle, third shelf up). The consumer may then locate the product in the aisle. As such, the NFC sensor/transmitters 216 (FIG. 2) and the mobile device 102 (FIG. 1) allow the consumer to fulfill the shopping list and locate products.

The embodiments presented herein provide several advantages. For example, the customer can load several coupons into the mobile device 202 (FIG. 2). Then, while at the store, the customer need not remember or search for the correct coupons 218 (FIG. 2). Rather, the customer shops and then is alerted if a relevant coupon may be available for a product. Further, the customer can set preferences 220 (FIG. 2) that will control which coupons to receive while shopping. Rather than accept all coupons 218 (FIG. 2) while shopping, and needlessly use the memory of the mobile device 102 (FIG. 1), the user controls or filters the coupons 218 (FIG. 2) using the preferences 220 (FIG. 2). In this way, the customer receives only the coupons 218 (FIG. 2) he or she is interested in receiving.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. While the principles of the disclosure have been described above in connection with specific apparatuses and methods, it is to be clearly understood that this description is made only by way of example and not as limitation on the scope of the disclosure.

What is claimed is:

1. A method for managing electronic coupons with a mobile device, the method comprising:
  receiving at the mobile device a communication from a near field sensor/transmitter, the communication associated with a product display that displays a product available for purchase, wherein the mobile device receives the communication after proceeding through a merchant facility until the product display is identified and approached such that the mobile device is in close proximity to the near field sensor/transmitter of the display having the product available for purchase;

translating the communication from the near field sensor transmitter to a format readable by the mobile device;

with a processor of the mobile device, determining an identifier associated with the translated communication, wherein the identifier identifies the product available for purchase;

running an application on the mobile device in an attempt to locate a coupon in a database of the mobile device, the coupon associated with the identifier such that the coupon may be subsequently be redeemed when purchasing the product that is being displayed at the same product display in which the mobile device was placed in close proximity, the coupon being selected upon a determination that the coupon has a highest redeemable value of any of a plurality of coupons associated with the identifier and the product stored in the database;

alerting a user of the mobile device that the database contains the coupon for the product displayed by the product display, wherein the alerting comprises one or both of causing a vibration element of the mobile device to actuate to cause the mobile device to vibrate or emitting a sound from a speaker of the mobile device;

displaying the coupon on a user interface of the mobile device; and discarding the communication after a predetermined period of time has elapsed since displaying the coupon without receiving a command related to the coupon, wherein the predetermined period of time is set by the application running on the mobile device.

2. The method as described in claim 1, further comprising parsing the communication to extract the identifier.

3. The method as described in claim 1, further comprising scanning one or more coupons in the database for the identifier.

4. The method as described in claim 1, further comprising:
determining if the user interacts with the mobile device;
if the user interacts with the mobile device, receiving a signal from the user interface device associated with the coupon; and
if the user does not interact with the mobile device, ending the alert.

5. The method as described in claim 4, wherein the user interaction includes the user requesting a location of a product related to the coupon.

6. The method as described in claim 4, wherein the user interaction includes the user acknowledging the alert for the coupon.

7. The method as described in claim 1, further comprising:
receiving one or more coupons from a merchant server; and
storing the one or more coupons in the database of the mobile device.

8. A mobile device comprising:
a housing;
an NFC component, the NFC component operable to communicate with an NFC transmitter that is located on a product display in a merchant facility, the NFC component operable to receive a communication from the NFC transmitter that identifies a product that is being displayed on the product display, wherein the communication includes a product identifier that identifies the product;
a database within the housing, the database comprising at least one coupon;
a processor within the housing and in communication with the NFC component, the processor operable to translate the communication from the NFC transmitter to a format readable by the mobile device and to determine whether the database includes a coupon associated with the product using the product identifier such that movement of the NFC component near the product display reads the product identifier that in turn permits the processor to identify the coupon that may be redeemed when purchasing the product displayed at the product display, the coupon being selected upon a determination that the coupon has a highest redeemable value of any of a plurality of coupons associated with the identifier and the product stored in the database, the processor operable to send a signal to alert a user that the coupon is available for the product when purchasing the product, wherein the signal causes one or both of a vibration element of the mobile device to actuate to cause the mobile device to vibrate or a sound to be emitted from a speaker of the mobile device; and
a user interface in communication with the processor, the user interface operable to receive the signal from the processor, the user interface operable to display an alert associated with the coupon for the user, wherein the processor discards the communication after a predetermined period of time has elapsed since displaying the coupon without receiving a command related to the coupon, wherein the predetermined period of time is set by a mobile wallet application running on the mobile device.

9. The mobile device as described in claim 8, the database comprising:
a product identifier field, wherein the product identifier field operable to allow the processor to associate one or more coupons with one or more products associated with the product identifier;
a coupon information field, wherein the coupon information field operable to provide information to the user interface for display for the user; and
a coupon identifier field, wherein the coupon identifier field operable to allow the processor to associate one or more coupons associated with the coupon identifier with one or more products.

10. The mobile device as described in claim 8, the database further comprising:
an identifier field, wherein the identifier field operable to allow the processor to associate one or more coupons with one or more products associated with the identifier;
a product description field, the product description field operable to allow the processor to associate one or more coupons with one or more products associated with the product description; and
a rules field, the rules field operable to allow the processor to determine if the NFC component should respond to the communication.

11. The mobile device as described in claim 8, wherein the database is operable to receive user preferences for one or more products,
wherein the processor is operable to receive information about a product, the processor operable to determine if the product associated with the product identifier is included in the user preferences, if the product is included in the user preferences, the processor operable to send a signal to the NFC component to receive a coupon from the NFC sensor, the NFC sensor/transmitter operable to receive a coupon associated with the product included in the user preferences, if the product is not part of the user preferences, the processor operable to end the communication with the NFC sensor.

12. The mobile device as described in claim 11, further comprising:
a memory in communication with the processor, the memory operable to store one or more instructions executable by the processor to execute one or more software modules, the instructions comprising:
instructions to execute an NFC application to receive a message from an NFC sensor/transmitter application, the NFC sensor/transmitter application providing an identifier for a product in a product display;
instructions to execute the mobile wallet application, the mobile wallet application operable to receive the identifier, the mobile wallet application operable to search the database for the identifier, the mobile wallet application operable to identify a coupon associated with the identifier; and
instructions to execute a user interface application, the user interface application operable to alert the user about the coupon identified by the mobile wallet application.

13. The mobile device as described in claim 12, wherein the mobile wallet application is operable to search a user preferences database for the identifier, the mobile wallet application operable to identify a product in the user preferences database, the mobile wallet application operable to request the NFC application to request a coupon associated with the product from the NFC application, NFC application operable to request the coupon, the NFC application operable to receive the coupon.

14. The mobile device as described in claim 8, wherein the NFC component is an RFID device, and wherein the NFC sensor is an RFID sensor.

15. A non-transitory computer-readable medium having stored thereon one or more instructions, all of the following instructions executable by a single computer, the instructions causing the single computer to execute a method for managing electronic coupons, the instructions that are all executable on the single computer comprising:
instructions for receiving a communication from a near field sensor, the communication associated with a product display;
instructions for translating the communication from the near field sensor to a readable format;
instructions for parsing the translated communication to extract a product identifier from the translated communication;
instructions for determining a product associated with the product identifier;
instructions for retrieving one or more preference rules associated with one or more products;
instructions for determining if one or more of the preference rules applies to the product associated with the product identifier;
if one or more preferences rules do apply, instructions for receiving a coupon associated with the product associated with the product identifier, the coupon being selected upon a determination that the coupon has a highest redeemable value of any of a plurality of coupons associated with the identifier and the product stored in the database;
instructions for alerting a user of a mobile device that a coupon is available for the product associated with the product identifier, wherein the alerting comprises one or both of causing a vibration element of the mobile device to actuate to cause the mobile device to vibrate or emitting a sound from a speaker of the mobile device; and
instructions for discarding the communication after a predetermined period of time has elapsed since displaying the coupon without receiving a command related to the coupon, wherein the predetermined period of time is set by a mobile wallet application running on the mobile device.

16. The computer-readable medium as defined in claim 15, wherein receiving the coupon comprises:
instructions for requesting the coupon from the near field sensor;
instructions for receiving the coupon from the near field sensor; and
instructions for storing the coupon in a database.

17. The computer-readable medium as defined in claim 15, wherein determining if one or more of the preference rules applies comprises:
instructions for searching a preference rules database for the product identifier; and
if the product identifier is found, instructions for reading the preference rule.

18. The computer-readable medium as defined in claim 15, wherein the preference rule is a shopping list.

19. The computer-readable medium as defined in claim 15, wherein, in response to the alert, the user accepts the coupon.

20. The computer-readable medium as defined in claim 19, wherein, in response to the user accepting the coupon, the user interface displays a location for the product.

21. The method as described in claim 1, wherein the application includes preference rules, and further comprising applying the identifier to the preference rules to determine whether to alert the user.

22. The method as in claim 21, wherein one of the preference rules determines when the product associated with the identifier is included in a shopping list.

23. The computer-readable medium as defined in claim 15, wherein one of the preference rules determines when the product associated with the identifier is included in a shopping list.

24. The method as in claim 21, wherein one of the preference rules determines when the coupon has a discount amount that is above a certain amount.

25. The computer-readable medium as in claim 15, wherein one of the preference rules determines when the coupon has a discount amount that is above a certain amount.

* * * * *